(12) United States Patent
Matsuyama et al.

(10) Patent No.: US 7,219,700 B2
(45) Date of Patent: May 22, 2007

(54) FLEXIBLE PIPE AND METHOD FOR PRODUCING THE SAME

(75) Inventors: Toshiharu Matsuyama, Saitama (JP); Keizo Ohta, Kanagawa (JP)

(73) Assignee: Kokusan Rasenkan Co., Ltd., Saitama (JP)

( * ) Notice: Subject to any disclaimer, the term of this patent is extended or adjusted under 35 U.S.C. 154(b) by 0 days.

(21) Appl. No.: 10/559,035

(22) PCT Filed: May 30, 2003

(86) PCT No.: PCT/JP03/06826

§ 371 (c)(1),
(2), (4) Date: Mar. 20, 2006

(87) PCT Pub. No.: WO2004/106795

PCT Pub. Date: Dec. 9, 2004

(65) Prior Publication Data

US 2006/0157134 A1    Jul. 20, 2006

(51) Int. Cl.
*F16L 11/00* (2006.01)

(52) U.S. Cl. .................... 138/134; 138/114; 138/118; 138/131; 464/174

(58) Field of Classification Search ............... 138/118, 138/114, 134, 135, DIG. 8, 131; 464/174; 482/122

See application file for complete search history.

(56) References Cited

U.S. PATENT DOCUMENTS

| | | | | |
|---|---|---|---|---|
| 434,748 | A | * | 8/1890 | Almond ..................... 138/134 |
| 1,053,394 | A | * | 2/1913 | Hubbell ...................... 464/174 |
| 1,179,577 | A | * | 4/1916 | Sundh ......................... 138/122 |
| 1,279,773 | A | * | 9/1918 | Sperling ....................... 464/7 |
| 1,746,719 | A | * | 2/1930 | Sneed ........................ 74/502.5 |
| 1,808,204 | A | * | 6/1931 | Brown ........................ 138/131 |
| 1,941,151 | A | * | 12/1933 | Nigro ......................... 138/134 |
| 1,959,692 | A | * | 5/1934 | Sneed ........................ 74/502.5 |
| 1,999,051 | A | * | 4/1935 | Kennedy ..................... 464/58 |

(Continued)

FOREIGN PATENT DOCUMENTS

GB    2142944 A  *  1/1985

(Continued)

OTHER PUBLICATIONS

European Search Report from EP 03730719.6-2424, dated Sep. 1, 2006.

*Primary Examiner*—Patrick F. Brinson
(74) *Attorney, Agent, or Firm*—Michaud-Duffy Group LLP

(57) ABSTRACT

In a flexible pipe having shape retaining capabilities, a first pipe is provided having a first base wire and a first subsidiary wire, the first base wire being wound in a spiral manner, the first subsidiary wire externally covering the first base wire and being fit into an external valley of the first base wire, and a second pipe having a second base wire and a second subsidiary wire, the second base wire being wound in a spiral manner in an opposite direction from the first base wire, the second subsidiary wire externally covering the second base wire and being fit into an external valley of the second base wire. The second pipe being provided inside and in contact with the first pipe. When a torsional force is applied to the first pipe, the second pipe generates a bearing force against the torsional force.

4 Claims, 2 Drawing Sheets

U.S. PATENT DOCUMENTS

| | | | |
|---|---|---|---|
| 2,066,473 A * | 1/1937 | Jorgensen | 285/237 |
| 2,083,937 A * | 6/1937 | Begg | 74/502.4 |
| 2,086,263 A * | 7/1937 | Fischer | 138/134 |
| 2,092,898 A * | 9/1937 | Tondeur | 464/174 |
| 2,126,955 A * | 8/1938 | Gleason | 464/174 |
| 2,850,915 A * | 9/1958 | Bratz | 74/502.5 |
| 5,060,660 A * | 10/1991 | Gambale et al. | 600/585 |
| 5,393,260 A | 2/1995 | Barth et al. | |
| 5,514,055 A * | 5/1996 | Elliott | 482/92 |
| 6,085,799 A * | 7/2000 | Kodaissi et al. | 138/135 |

FOREIGN PATENT DOCUMENTS

| | | |
|---|---|---|
| JP | 59-119605 | 7/1984 |
| JP | 61-28217 | 2/1986 |
| JP | 4092182 A | 3/1992 |
| JP | 7-305789 | 11/1995 |
| JP | 7-305790 | 11/1995 |
| KR | 1998-065086 | 11/1998 |
| WO | WO 92/20957 | 11/1992 |

* cited by examiner

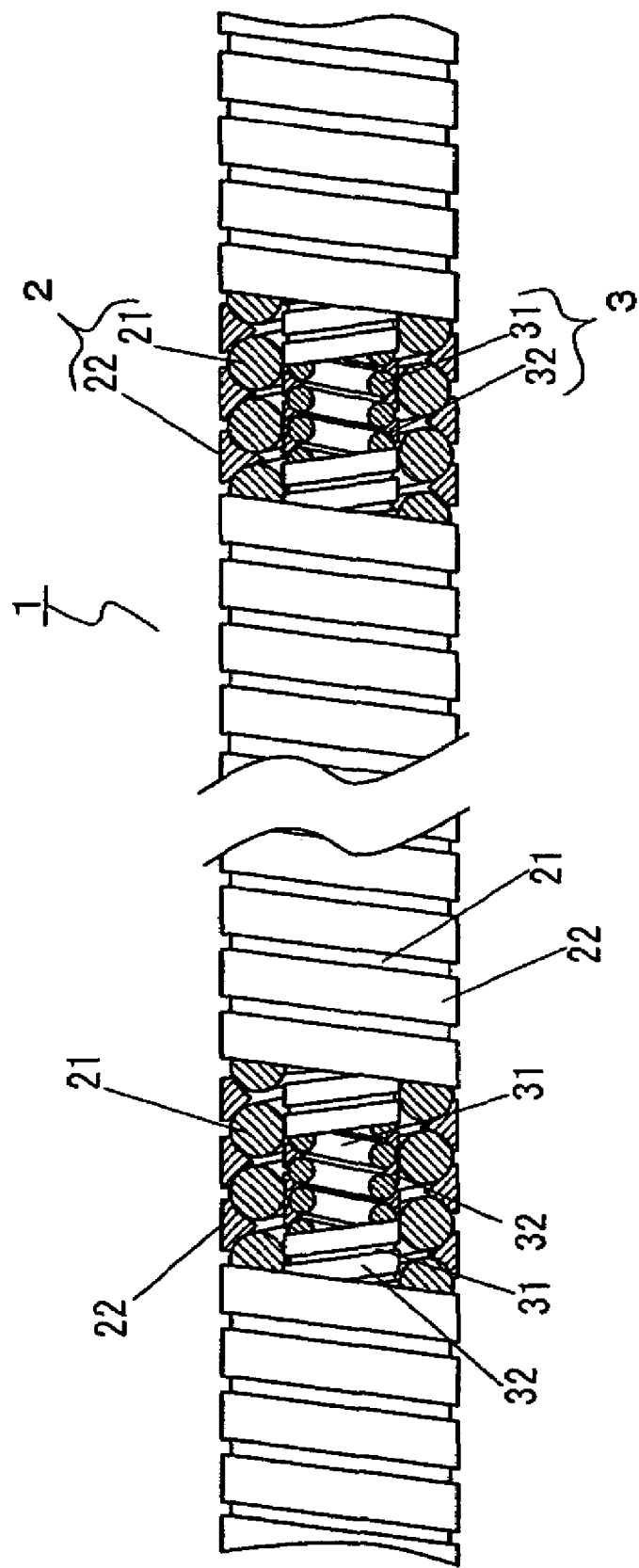

FLEXIBLE PIPE AND METHOD FOR PRODUCING THE SAME

TECHNICAL FIELD

This invention generally relates to flexible pipes, and more particularly, to a standing flexible pipe that can be bent arbitrarily and has capabilities of maintaining the shape thereof.

BACKGROUND OF THE INVENTION

Flexible pipe, also known as flexible tube, has a variety of shapes and sizes. Flexible pipes are widely used for piping, joint, and as a protecting tube. Of these flexible pipes, particularly, there is a flexible pipe having a stand structure (hereinafter, referred to as standing flexible pipe). The standing flexible pipe is configured so that the user is able to bend freely same as a normal flexible pipe, and in addition, has capabilities of retaining the shape thereof. Such standing flexible pipe is widely employed for desk light, stand microphone, or the like. For instance, the standing flexible pipe is used as a support for a lamp, standing from the main body of the desk light, and the wiring is internally provided from the main body of the desk light to the lamp. The user is able to bend the support (the standing flexible pipe) to change the position of the lamp to a desired one.

FIG. 1 is a view of a conventional standing flexible pipe that is partially cut out for exhibiting an internal configuration. A conventional standing flexible pipe 100 includes a base wire 101 having a circular cross-section wound in a spiral manner and a subsidiary wire 102 having a substantially triangular cross-section. The subsidiary wire 102 is also wound in a spiral manner to cover the base wire 101, and is attached firmly to be fit into an external valley of the base wire 101. When the standing flexible pipe 100 is bent, friction occurs between the base wire 101 and the subsidiary wire 102 that are in contact with each other. The standing flexible pipe 100 bent retains the state (shape) with the afore-mentioned friction.

The standing flexible pipe 100 shown in FIG. 1, however, has a disadvantage in that the bearing force is weakened if the torsional force is applied to wind back more than a given amount. If the standing flexible pipe loses the retention thereof, the advantage is degraded, thus causing the problem in that, for example, the lamp of the desk light cannot be fixed at a desired position. If the user repeats twisting along the axis without understanding the structural characteristics, the afore-mentioned problem will be exposed at an early stage.

The standing flexible pipe 100 retains a bent state, with the friction between the base wire 101 and the subsidiary wire 102. However, once the torsional force is applied to wind back, the base wire 101 and the subsidiary wire 102 are not adhered to each other. For this reason, the frictional force cannot be obtained sufficiently, thereby causing degraded retention. Also, it is known that the adhesiveness between the base wire 101 and the subsidiary wire 102 gradually degrades with age.

To address the above-described problem, techniques have been proposed in Japanese Patent Application Publication No. 7-305789 and Japanese Patent Application Publication No. 7-305790. However, these techniques cannot be applied to the standing flexible pipe having a structure in which the wires are wound in a spiral manner. In other words, there is no technique for improving the bearing force of the standing flexible pipe against the torsional force to wind back.

SUMMARY OF THE INVENTION

The present invention is directed to a standing flexible pipe that has a novel structure of generating a force (bearing force) against a torsional force to wind back, retaining the shape even if the torsional force is applied, and being in use over a long period of time.

According to one aspect of the present invention, there is provided a flexible pipe including a first pipe having a first base wire and a first subsidiary wire, the first base wire being wound in a spiral manner, the first subsidiary wire externally covering the first base wire and being fit into an external valley of the first base wire; and a second pipe having a second base wire and a second subsidiary wire, the second base wire being wound in a spiral manner in an opposite direction from the first base wire, the second subsidiary wire externally covering the second base wire and being fit into an external valley of the second base wire. The second pipe may be provided inside the first pipe to be in contact with each other.

According to the present invention, there are provided the second pipe wound in an opposite direction from the first pipe, and the second pipe is firmly adhered inside the first pipe. Hence, when a torsional force to wind back is applied to the first pipe, the second pipe generates the bearing force against the torsional force. The standing flexible pipe in accordance with an embodiment of the present invention is configured to produce the bearing force against the torsional force in the first pipe. Therefore, even if the torsional force is applied, the retention of the standing flexible pipe is not degraded like the conventional ones. In particular, the standing flexible pipe in accordance with an embodiment of the present invention is configured to include the second pipe provided in a spiral manner in an opposite direction from the spiral of the first pipe. Accordingly, when the torsional force (external force) to wind back is applied to the first pipe, the external force operates in a direction to wind the second pipe and the second pipe is wound more firmly in a spiral direction to support the first pipe sufficiently.

On the above-mentioned flexible pipe, the first and second base wires may be steel wires having substantially circular cross-sections; and the first and second subsidiary wires may be steel wires having substantially triangular cross-sections. One surface of the second subsidiary wire of the second pipe may be attached firmly to an inner surface of the first base wire of the first pipe.

According to another aspect of the present invention, there is provided a method for manufacturing a flexible pipe including winding a second base wire of a second pipe around a linear base material in a spiral manner, and further winding a second subsidiary wire to be fit into an external valley of the second base wire in the same direction as the second base wire; and winding a first base wire around the second subsidiary wire in the spiral manner in an opposite direction from the second subsidiary wire, and further winding a first subsidiary wire to be fit into an external valley of the first base wire in the same direction as the first base wire.

BRIEF DESCRIPTION OF THE DRAWINGS

FIG. 2 is a view of a standing flexible pipe 1 in accordance with an embodiment of the present invention that is partially cut out for exhibiting the internal configuration.

DETAILED DESCRIPTION OF THE PREFERRED EMBODIMENTS

Figure 1:
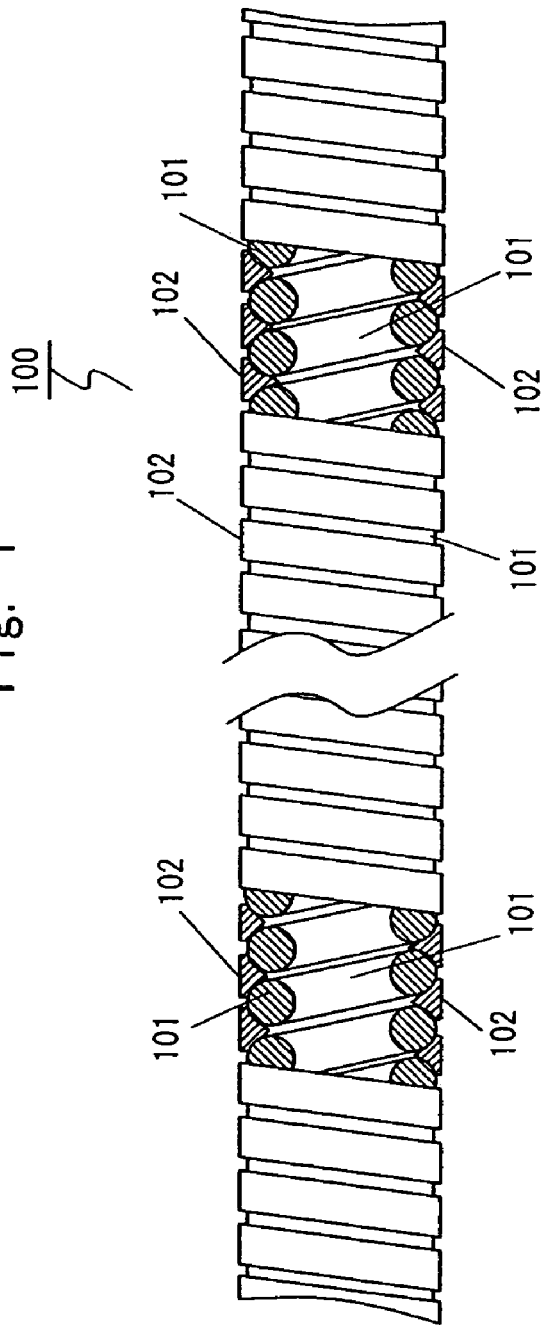
FIG. 1 is a view of a conventional standing flexible pipe that is partially cut out for exhibiting an internal configuration.

A description will now be given, with reference to the accompanying drawings, of embodiments of the present invention.

FIG. 2 is a view of a standing flexible pipe 1 in that is partially cut out for exhibiting the internal configuration. The cross-sections of the respective wires are shown by hatching.

The standing flexible pipe 1 includes a first pipe 2 and a second pipe 3. These two pipes have different diameters of spiral. The first pipe 2 includes a base wire (a first base wire) 21 having a circular cross-section wound in a spiral manner and a subsidiary wire (a first subsidiary wire) 32 having a substantially triangular cross-section, which is wound in a spiral manner to cover the base wire 21 and is attached firmly to be fit into an external valley of the base wire 21.

Inside the first pipe 2, the second pipe 3 having a smaller diameter is arranged in contact with the first pipe 2. The second pipe 3 has the fundamental structure same as the first pipe 2, yet is different in that the second pipe 3 has a smaller diameter than that of the first pipe 2. That is to say, the second pipe 3 includes a base wire (a second base wire) 31 having a circular cross-section wound in a spiral manner and a subsidiary wire (a second subsidiary wire) 32 having a substantially triangular cross-section, which is wound in a spiral manner to cover the base wire 31 and is attached firmly to be fit into an external valley of the base wire 31.

However, the second pipe 3 is wound in an opposite direction from that of the first pipe 2. The subsidiary wire 32 of the second pipe 2 is configured to be in contact with the base wire 31 of the first pipe 2 having such double structure is manufactured in the following two stages of process. In the first process, the base wire 31 of the second pipe is wound around a linear base material, and the subsidiary wire 32 is wound around in the same direction to be attached firmly and fit into the external valley of the base wire 31. In the second process, the base wire 21 of the first pipe is wound around the subsidiary wire 32 in an opposite direction, and a subsidiary wire 22 is wound around in the same direction to be attached firmly and fit into the external valley of the base wire 21, to complete the pipe.

Even when the torsional force is applied in a direction to wind back onto the first pipe 2 of the standing flexible pipe 1 having the above-mentioned structure with one end thereof being firmly fixed, it is possible to suppress the distortion toward the direction to wind back generated in the first pipe 2. This is because the second pipe 3 in contact with the inner surface of the first pipe 2 has a sufficient bearing force against the torsional force. Hence, even if the force is applied to wind back, the base wire 21 and the subsidiary wire 22 of the first pipe 2 are capable of maintaining in contact with each other, thereby maintaining the shape retention. In particular, the standing flexible pipe 1 includes the second pipe 3 wound spirally in an opposite direction. Therefore, the force to wind back the first pipe 2 acts as the force to wind the second pipe 3 to the contrary. With such configuration, the second pipe 3 can support the internal surface of the second pipe 3 more firmly.

As is obvious from the above description, the standing flexible pipe 1 has capabilities for retaining the shape thereof even if the torsional force to wind back is applied. Such capabilities are effective against the aged deterioration, thus it is possible to provide the standing flexible pipe that can keep the retention over a long period of time. In addition, the second pipe 3 is provided inside the first pipe 2, both the first pipe 2 and the second pipe 3 having the same configuration. Even if the first pipe 2 provided externally is weakened, the shape can be retained by the second pipe 3.

The embodiment has been described. The present invention is not limited to the above-mentioned embodiments, and other embodiments, variations and modifications may be made without departing from the scope of the present invention.

As is obvious from the above description, according to the present invention, the pipe is configured to have capabilities that produce the bearing force against the torsion, thereby allowing to provide the standing flexible pipe that can be used over a long period of time without degrading the retention.

What is claimed is:

1. A flexible pipe comprising:
   a first pipe having a first base wire and a first subsidiary wire, the first base wire being wound in a spiral manner, the first subsidiary wire externally covering the first base wire and being fit into an external valley of the first base wire; and
   a second pipe having a second base wire and a second subsidiary wire, the second base wire being wound in a spiral manner in an opposite direction from the first base wire, the second subsidiary wire externally covering the second base wire and being fit into an external valley of the second base wire, and wherein
   the second pipe is provided inside the first pipe so that the first and second pipes are in contact with each other.

2. The flexible pipe as claimed in claim 1, wherein the first and second base wires are steel wires having substantially circular cross-sections, and the first and second subsidiary wires are steel wires having substantially triangular cross-sections.

3. The flexible pipe as claimed in claim 2, wherein one surface of the second subsidiary wire of the second pipe is attached firmly to an inner surface of the first base wire of the first pipe.

4. A method of manufacturing a flexible pipe, said method comprising the steps of:
   winding a second base wire of a second pipe around a linear base material in a spiral manner, and further winding a second subsidiary wire to be fit into an external valley of the second base wire in the same direction as the second base wire; thereby forming the second pipe; and
   winding a first base wire around the second subsidiary wire in the spiral manner in an opposite direction from the second subsidiary wire, and further winding a first subsidiary wire to be fit into an external valley of the first base wire in the same direction as the first base wire, thereby forming a first pipe over the second pipe, the first pipe and the second pipe being in contact with one another.

* * * * *